United States Patent
Kim et al.

(10) Patent No.: US 10,460,184 B2
(45) Date of Patent: Oct. 29, 2019

(54) IMAGE INFORMATION ACQUIRING APPARATUS, VEHICLE, AND CONTROL METHOD THEREOF

(71) Applicants: Hyundai Motor Company, Seoul (KR); Kia Motors Corporation, Seoul (KR)

(72) Inventors: Hongbum Kim, Gyeonggi-do (KR); JiHyun Song, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/625,761

(22) Filed: Jun. 16, 2017

(65) Prior Publication Data

US 2018/0239971 A1 Aug. 23, 2018

(30) Foreign Application Priority Data

Feb. 23, 2017 (KR) .......................... 10-2017-0024030

(51) Int. Cl.
| | |
|---|---|
| *G06K 9/00* | (2006.01) |
| *G05D 1/00* | (2006.01) |
| *B60W 30/14* | (2006.01) |
| *G06K 9/20* | (2006.01) |

(52) U.S. Cl.
CPC ....... *G06K 9/00818* (2013.01); *B60W 30/146* (2013.01); *G05D 1/0088* (2013.01); *G06K 9/00805* (2013.01); *G06K 9/2054* (2013.01)

(58) Field of Classification Search
None
See application file for complete search history.

(56) References Cited

U.S. PATENT DOCUMENTS

| | | | | |
|---|---|---|---|---|
| 8,428,307 | B2 * | 4/2013 | Bradai | G08G 1/09626 |
| | | | | 382/104 |
| 8,700,299 | B2 * | 4/2014 | Morita | G08G 1/096716 |
| | | | | 701/123 |
| 8,725,394 | B2 * | 5/2014 | Bahlmann | B60W 30/146 |
| | | | | 340/907 |
| 8,843,292 | B2 * | 9/2014 | Heft | B60T 7/22 |
| | | | | 701/70 |

(Continued)

FOREIGN PATENT DOCUMENTS

| | | |
|---|---|---|
| EP | 1028387 A2 | 8/2000 |
| EP | 1327968 A2 | 7/2003 |

(Continued)

*Primary Examiner* — Soo Jin Park
(74) *Attorney, Agent, or Firm* — Mintz Levin Cohn Ferris Glovsky and Popeo, P.C.; Peter F. Corless

(57) ABSTRACT

A vehicle includes: a display; a photographing device configured to acquire image information of a road on which the vehicle currently travels; and a main controller configured to: i) detect first speed limit information based on the acquired image information, ii) calculate a difference between the first speed limit information and pre-stored second speed limit information corresponding to the road on which the vehicle currently travels, and iii) determine speed limit information that is to be displayed on the display based on at least one of whether the calculated difference exceeds a predetermined level and whether the vehicle is no longer traveling on the road.

17 Claims, 11 Drawing Sheets

(56) References Cited

U.S. PATENT DOCUMENTS

| | | | |
|---|---|---|---|
| 9,056,550 B2* | 6/2015 | To | B60K 31/18 |
| 9,988,050 B2* | 6/2018 | Yamashita | B60W 50/12 |
| 9,994,227 B2* | 6/2018 | Yoshitomi | B60W 40/04 |
| 10,054,458 B2* | 8/2018 | Oh | G01C 21/3492 |
| 10,152,883 B2* | 12/2018 | Fujimaki | G08G 1/09623 |
| 2010/0161195 A1* | 6/2010 | Shin | B60W 10/06 |
| | | | 701/93 |
| 2013/0190983 A1* | 7/2013 | Tatsukawa | B62D 6/00 |
| | | | 701/41 |
| 2015/0302747 A1* | 10/2015 | Ro | G08G 1/096783 |
| | | | 340/905 |
| 2015/0325125 A1 | 11/2015 | Mochizuki et al. | |
| 2016/0350606 A1* | 12/2016 | Yoshitomi | G06K 9/00818 |
| 2017/0015319 A1* | 1/2017 | Knoller | B60W 30/146 |
| 2017/0015320 A1* | 1/2017 | Knoller | B60W 50/14 |
| 2017/0144664 A1* | 5/2017 | Yamashita | B60W 50/12 |
| 2017/0148327 A1* | 5/2017 | Sim | G08G 1/167 |
| 2017/0351411 A1* | 12/2017 | Buecker | G08G 1/096716 |
| 2018/0247532 A1* | 8/2018 | Koyama | B60R 1/00 |

FOREIGN PATENT DOCUMENTS

| | | |
|---|---|---|
| JP | 2011192044 A | 9/2011 |
| KR | 2015-0121977 A | 10/2015 |

\* cited by examiner

IMAGE INFORMATION ACQUIRING APPARATUS, VEHICLE, AND CONTROL METHOD THEREOF

CROSS-REFERENCE TO RELATED APPLICATION

This application claims the benefit of priority to Korean Patent Application No. 10-2017-0024030, filed on Feb. 23, 2017 in the Korean Intellectual Property Office, the disclosure of which is incorporated herein by reference as if fully set forth herein.

BACKGROUND

1. Technical Field

Embodiments of the present disclosure relate generally to vehicular technologies and, more particularly, to a vehicle providing information about a driving environment, and a control method thereof.

2. Description of the Related Art

The Advanced Driver Assistance System (ADAS) has been installed in many recent vehicles. The ADAS is system for assisting a driver by providing warnings, such as a collision warning indicating a risk of collision with another vehicle, a lane departure warning indicating a lane departure (e.g., due to sleepiness or the like), and a pedestrian collision warning indicating a risk of collision with a pedestrian, in order to mitigate risk factors the driver may fail to detect. Also, the ADAS can provide navigation information of a route to a destination, as well as road information such as the speed limit of a road on which the vehicle currently travels.

However, since the road information continues to change, there are some cases in which the provided road information does not reflect the current environment, causing confusion for the driver. For this reason, drivers should be provided with more accurate road information.

SUMMARY

It is an aspect of the present disclosure to provide an image information acquiring apparatus for determining accurate speed limit information based on a driving environment or situation, a vehicle, and a control method thereof.

Additional aspects of the disclosure will be set forth in part in the description which follows and, in part, will be apparent from the description, or may be learned by practice of the disclosure.

In accordance with embodiments of the present disclosure, a vehicle includes: a display; a photographing device configured to acquire image information of a road on which the vehicle currently travels; and a main controller configured to: i) detect first speed limit information based on the acquired image information, ii) calculate a difference between the first speed limit information and pre-stored second speed limit information corresponding to the road on which the vehicle currently travels, and iii) determine speed limit information that is to be displayed on the display based on at least one of whether the calculated difference exceeds a predetermined level and whether the vehicle is no longer traveling on the road.

The second speed limit information may be pre-stored among a plurality of pre-stored speed limit information in a map database or an image database.

The vehicle may further include a position sensor configured to measure position information of the vehicle. The main controller may be further configured to: i) detect a location of the vehicle based on the measured position information, ii) determine whether the vehicle is located in either a first zone ranging from a branch point existing on the road on which the vehicle currently travels to a point located at a predetermined distance before the branch point or a second zone ranging from the branch point to another point located at a predetermined distance after the branch point in the traveling direction of the vehicle, and iii) determine the speed limit information that is to be displayed on the display based further on whether the vehicle is located in the first zone or the second zone.

When the main controller determines that the vehicle is located in the first zone, and that the difference between the first speed limit information and the second speed limit information is less than the predetermined level, the main controller may be further configured to change the speed limit information that is to be displayed on the display from the second speed limit information to the first speed limit information.

The main controller may be further configured to update an image database to change speed limit information of the road on which the vehicle currently travels from the second speed limit information to the first speed limit information.

When the main controller determines that the vehicle is located in the first zone, and that the difference between the first speed limit information and the second speed limit information exceeds the predetermined level, the main controller may be further configured to determine the speed limit information that is to be displayed on the display based on whether the vehicle is no longer traveling on the road.

The main controller may be further configured to perform image processing on the acquired image information to calculate a number of lane changes by the vehicle changes and determine whether the vehicle is no longer traveling on the road based on the calculated number of lane changes.

The vehicle may further include an acceleration sensor configured to measure acceleration information of the vehicle. The main controller may be further configured to compare the measured yaw rate information to a predetermined level and determine whether the vehicle is no longer traveling on the road based on whether the yaw rate information exceeds the predetermined level.

The vehicle may further include an acceleration sensor configured to measure acceleration information of the vehicle. The main controller may be further configured to compare the measured steering angle information to a predetermined level and determine whether the vehicle is no longer traveling on the road based on whether the steering angle information exceeds the predetermined level.

The vehicle may further include an acceleration sensor configured to measure acceleration information of the vehicle. The main controller may be further configured to determine whether the vehicle is no longer traveling on the road based on the measured acceleration information.

When the main controller determines that the vehicle is located in the first zone, that the difference between the first speed limit information and the second speed limit information exceeds the predetermined level, and that the vehicle is no longer traveling on the road, the main controller may be further configured to change the speed limit information that is to be displayed on the display from the second speed limit information to the first speed limit information.

When the main controller determines that the vehicle is located in the second zone, the main controller may be further configured to determine the speed limit information that is to be displayed on the display by recognizing a location of a road sign on which the first speed limit information is written from the acquired image information.

When the main controller determines that the vehicle is located in the second zone, and that a road sign on which the first speed limit information is written, detected from the acquired image information, is located at a right side of the road on which the road currently travels, the main controller may be further configured to determine the speed limit information that is to be displayed on the display based on whether the difference between the first speed limit information and the second speed limit information exceeds the predetermined level.

When the main controller determines that the vehicle is located in the second zone and that a road sign on which the first speed limit information is written, detected from the acquired image information, is located at a right side of the road on which the vehicle currently travels, the main controller may be further configured to change the speed limit information that is to be displayed on the display from the second speed limit information to the first speed limit information.

Furthermore, in accordance with embodiments of the present disclosure, an image information acquiring apparatus includes: a photographing device configured to acquire image information of a road on which the vehicle currently travels; and an image controller configured to configured to: i) detect first speed limit information based on the acquired image information, ii) calculate a difference between the first speed limit information and pre-stored second speed limit information corresponding to the road on which the vehicle currently travels, and iii) determine speed limit information that is to be displayed on a display based on at least one of whether the calculated difference exceeds a predetermined level and whether the vehicle is no longer traveling on the road.

The second speed limit information may be pre-stored among a plurality of pre-stored speed limit information in a map database or an image database.

The image controller may be further configured to: i) detect a location of the vehicle based on position information measured by a position sensor, ii) determine whether the vehicle is located in either a first zone ranging from a branch point existing on the road on which the vehicle currently travels to a point located at a predetermined distance before the branch point or a second zone ranging from the branch point to another point located at a predetermined distance after the branch point in the traveling direction of the vehicle, and iii) determine the speed limit information that is to be displayed on the display based further on whether the vehicle is located in the first zone or the second zone.

When the image controller determines that the vehicle is located in the first zone and that the difference between the first speed limit information and the second speed limit information exceeds the predetermined level, the main controller may be further configured determine the speed limit information that is to be displayed on the display based further on whether the vehicle is no longer traveling on the road.

When the image controller determines that the vehicle is located in the second zone, the image controller may be further configured to determine the speed limit information that is to be displayed on the display by recognizing a location of a road sign on which the first speed limit information is written from the acquired image information.

Furthermore, in accordance with embodiments of the present disclosure, a method of controlling a vehicle includes: acquiring image information of a road on which the vehicle currently travels using a photographing device; detecting first speed limit information based on the acquired image information; calculating a difference between the first speed limit information and pre-stored second speed limit information corresponding to the road on which the vehicle currently travels; and determining speed limit information that is to be displayed on a display based on at least one of whether the calculated difference exceeds a predetermined level and whether the vehicle is no longer traveling on the road.

BRIEF DESCRIPTION OF THE DRAWINGS

These and/or other aspects of the disclosure will become apparent and more readily appreciated from the following description of the embodiments, taken in conjunction with the accompanying drawings of which.

Figure 1:
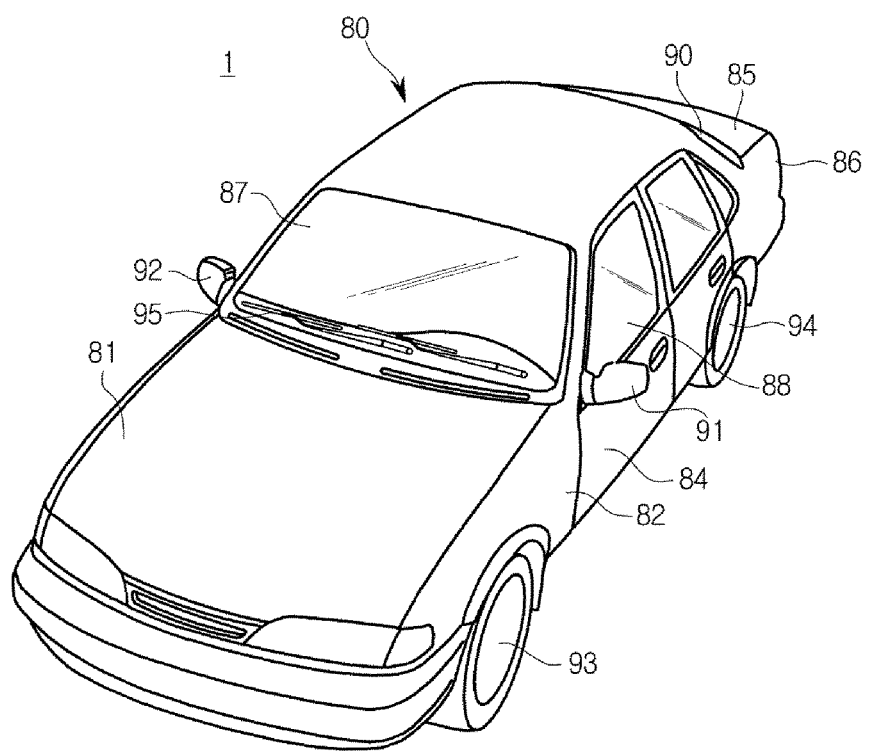
FIG. 1 shows an external configuration of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in detail with reference to the accompanying drawings.

Figure 2:
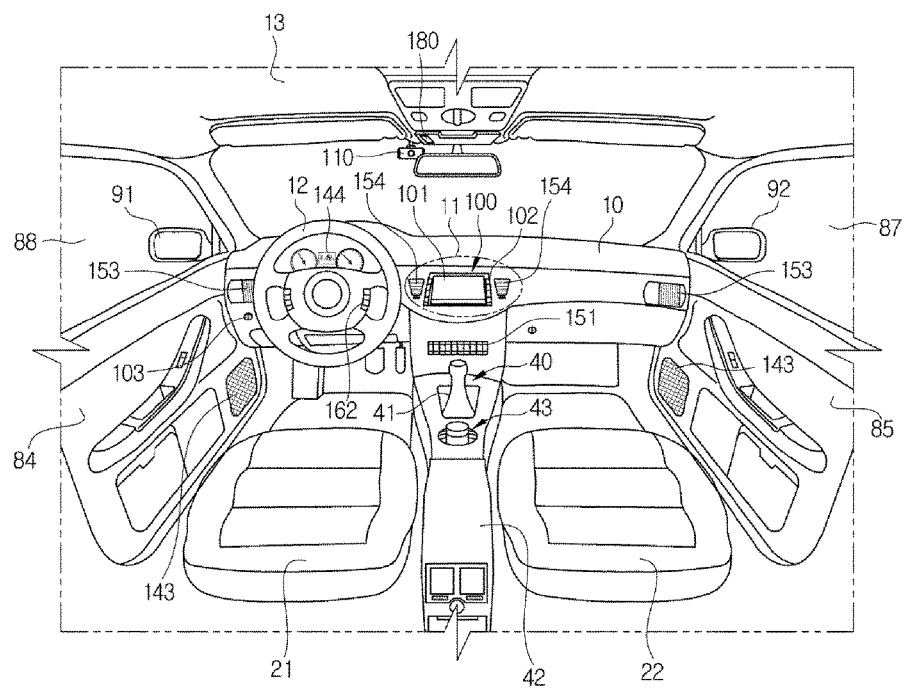
FIG. 2 shows an internal configuration of a vehicle according to embodiments of the present disclosure.

FIG. 1 schematically shows an external configuration of a vehicle according to embodiments of the present disclosure, and FIG. 2 schematically shows an internal configuration of a vehicle according to embodiments of the present disclosure. The following description will be given by referring to FIGS. 1 and 2 together, in order to avoid redundant descriptions.

As shown in FIG. 1, a vehicle 1 may include a vehicle body 80 forming the exterior appearance of the vehicle 1, and a plurality of wheels 93 and 94 to move the vehicle 1. The vehicle body 80 may include a hood 81, a plurality of front fenders 82, a plurality of doors 84, a trunk lid 85, and a plurality of quarter panels 86.

Also, the vehicle body 80 may include a front window 87 installed in the front part of the body 80 to provide a front view of the vehicle 1, a plurality of side windows 88 to provide side views of the vehicle 1, a plurality of side-view mirrors 91 and 92 installed around the doors 84 to provide rear and side views of the vehicle 1, and a rear window 90 installed in the rear part of the body 80 to provide a rear view of the vehicle 1. Hereinafter, the internal configuration of the vehicle 1 will be described in detail.

In the inside of the vehicle 1, a steering wheel 12 to enable a driver to change a driving direction may be provided. The steering wheel 12 may include various buttons to enable the driver to input various control commands during driving. The steering wheel 12 may be located to the left or right inside the vehicle 1 according to country traffic rules, as shown in FIG. 2. Also, road signs may be located at the left or right side from a road according to country traffic rules. This will be described in detail, later.

The vehicle 1 may include an air conditioner. The air conditioner means an apparatus of controlling an air-conditioning environment, such as the indoor/outdoor environmental condition of the vehicle 1, the intake/exhaust of air, air circulation, a heating/cooling state, etc., automatically or according to the user's control command. For example, the vehicle 1 may include the air conditioner to perform both heating and cooling, and to exhaust heated or cooled air through a vent 154, thereby controlling the inside temperature of the vehicle 1.

Also, the vehicle 1 may include a sound input device 180. For example, the sound input device 180 may be a microphone. The sound input device 180 may receive various sound signals through the microphone, and convert the sound signals into electrical signals. The vehicle 1 may receive a user's voice command through the sound input device 180, and execute a function corresponding to the received voice command.

Meanwhile, a navigation terminal 100 may be provided in the inside of the vehicle 1. The navigation terminal 100 may be a terminal capable of performing an audio function and a video function, as well as a navigation function for guiding a route to a destination. The navigation terminal 100 is also called an Audio Video Navigation (AVN) terminal, however, in the following description, the navigation terminal 100 will be referred to as a "navigation terminal" 100 for convenience of description.

The navigation terminal 100 may selectively display at least one of an audio screen, a video screen, and a navigation screen through a display 101, or may display various control screens related to the control of the vehicle 1, or screens related to additional functions that can be executed by the navigation terminal 100.

According to embodiments of the present disclosure, the navigation terminal 100 may interwork with the air conditioner to display various control screens related to the control of the air conditioner through the display 101. Also, the navigation terminal 100 may control the operation state of the air conditioner to adjust the air-conditioning environment of the vehicle 1. Also, the navigation terminal 100 may display a map showing a route to a destination for a driver through the display 101, although not limited to this. The navigation terminal 100 may display a map showing a route to a destination for a driver on the display 101, based on map data stored in map database which will be described later.

Meanwhile, the display 101 may be disposed in a center fascia 11 located in the center area of a dashboard 10. The display 101 may be implemented as a Liquid Crystal Display (LCD), a Light Emitting Diode (LED) display, a Plasma Display Panel (PDP) display, an Organic Light Emitting Diode (OLED) display, a Cathode Ray Tube (CRT) display, etc., although not limited to these.

It should be understood that the exterior configuration of the vehicle 1 illustrated in FIG. 1 and described above is provided merely for demonstration purposes, and thus does not limit the scope of the present disclosure.

Referring next to FIG. 2, in the interior of the vehicle 1, a speaker 143 may be disposed to output sound. Accordingly, the vehicle 1 may output sound required to perform the audio function, the video function, the navigation function, and the additional functions through the speaker 143. For example, the vehicle 1 may provide information about a route to a destination for the driver through the speaker 143, although not limited to this.

Also, a cluster 144 may be disposed in the inside of the vehicle 1. The cluster 144 is also called an instrument panel, however, in the following description, the cluster 144 will be referred to as a "cluster" 144 for convenience of description. On the cluster 144, the driving speed, Revolution Per Minute (RPM), fuel gauge, etc. of the vehicle 1 may be displayed. Also, the cluster 144 may interwork with the navigation terminal 100 to display a driving path, and also display road environment information such as speed limit information.

Also, the vehicle 1 may include a head-up display. The head-up display may include a wind shield type of projecting light onto a reflector and transmitting light reflected by the reflector onto the front window 87 to display various information on the front window 87, and a combiner type of displaying various information through a separate screen. The head-up display included in the vehicle 1 according to the current embodiment may include both the wind shield type and the combiner type. Accordingly, the vehicle 1 may display various information through the head-up display.

Hereinafter, for convenience of description, devices capable of displaying various information, such as the display 101, the cluster 144, and the head-up display, will be collectively referred to as displays, as long as they do not need to be distinguished from each other.

Meanwhile, a navigation input device 102 may be disposed in the center fascia 11 which is the center area of the dashboard 10. The driver may manipulate the navigation input device 102 to input various control commands or to input a destination, etc.

The navigation input device 102 may be provided as a hard key type around the display 101. If the display 101 is implemented as a touch screen type, the display 101 may perform the functions of the navigation input device 102.

In the center console 40, a center input device 43 of a jog shuttle type or a hard key type may be provided. The center console 40 may be located between a driver seat 21 and a passenger seat 22, and a gear shifting lever 41 and a tray 42 may be installed in the center console 40. The center input device 43 may perform all or some functions of the navigation input device 102.

Also, an image information acquiring apparatus 110 may be disposed in the inside of the vehicle 1. The image information acquiring apparatus 110 may include an apparatus such as a camera capable of acquiring and storing image information.

The image information acquiring apparatus 110 may acquire image information about a front view of the vehicle 1. The "front" means a direction in which a driver inside the vehicle 1 looks the front window 87. The image information may include image information about various objects, such as trees around roads or traffic lights, as well as lanes, guide rails, road signs, and other vehicles located around the vehicle 1.

The vehicle 1 may apply an image processing process to image information acquired by the image information acquiring apparatus 110 to recognize a road sign included in the image information, and to detect speed limit information written on the recognized road sign, which will be described later. The speed limit information written on the road sign may be speed limit information of a road on which the vehicle 1 travels currently, or speed limit information of a branch road connected to the road on which the vehicle 1 travels currently, through a branch point.

Depending on whether the driver gets out of a road on which the vehicle 1 travels currently through a branch point to drive the vehicle 1 to a branch road, or whether the driver continues to drive the vehicle 1 on the road on which the vehicle 1 travels currently, speed limit information that is displayed on the display 101 may need to change. For example, it is assumed that speed limit information detected from image information is 60 km/h which is speed limit information of a branch road, and speed limit information of the road on which the vehicle 1 travels currently is 100 km/h. In this case, if speed limit information of 60 km/h is displayed on the display 101 when the driver intends to continue to drive the vehicle 1 on the road on which the vehicle 1 travels currently, the driver may feel confusion.

Also, there is a case in which speed limit information detected from image information is 90 km/h, but speed limit information of a road on which the vehicle 1 travels currently is stored as 100 km/h in map database or image database. In this case, it is difficult to determine whether the detected speed limit information is speed limit information of a branch road or changed speed limit information of the road on which the vehicle 1 travels currently.

The vehicle 1 according to embodiments of the present disclosure may determine at least one of the driver's intention recognized by an internal device of the vehicle 1, and a difference between detected speed limit information and pre-stored speed limit information, and display accurate speed limit information on the display 101 based on the result of the determination. Hereinafter, an internal component of the vehicle 1 to display accurate speed limit information will be described in more detail.

It should be understood that the interior configuration of the vehicle 1 illustrated in FIG. 2 and described above is provided merely for demonstration purposes, and thus does not limit the scope of the present disclosure.

Figure 3:
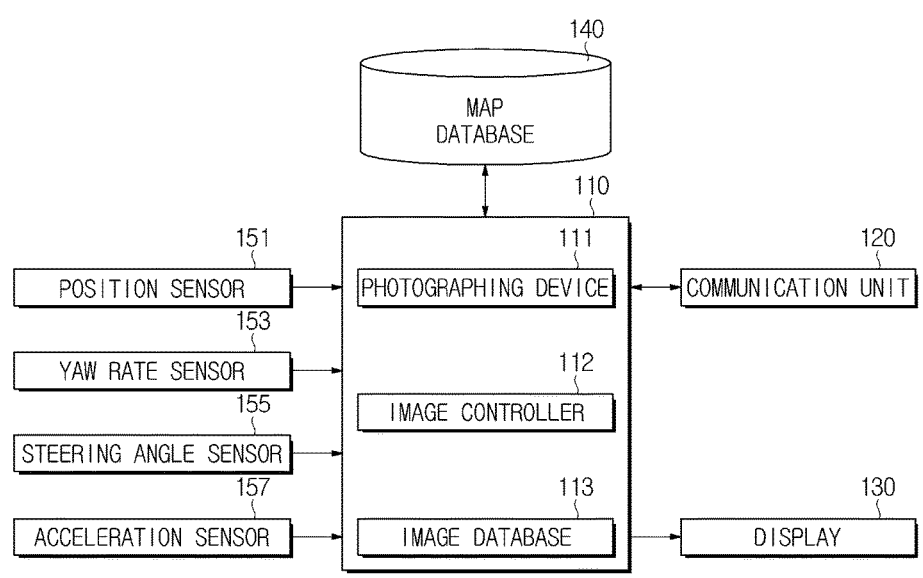
FIG. 3 is a control block diagram of a vehicle according to embodiments of the present disclosure.
Figure 4:
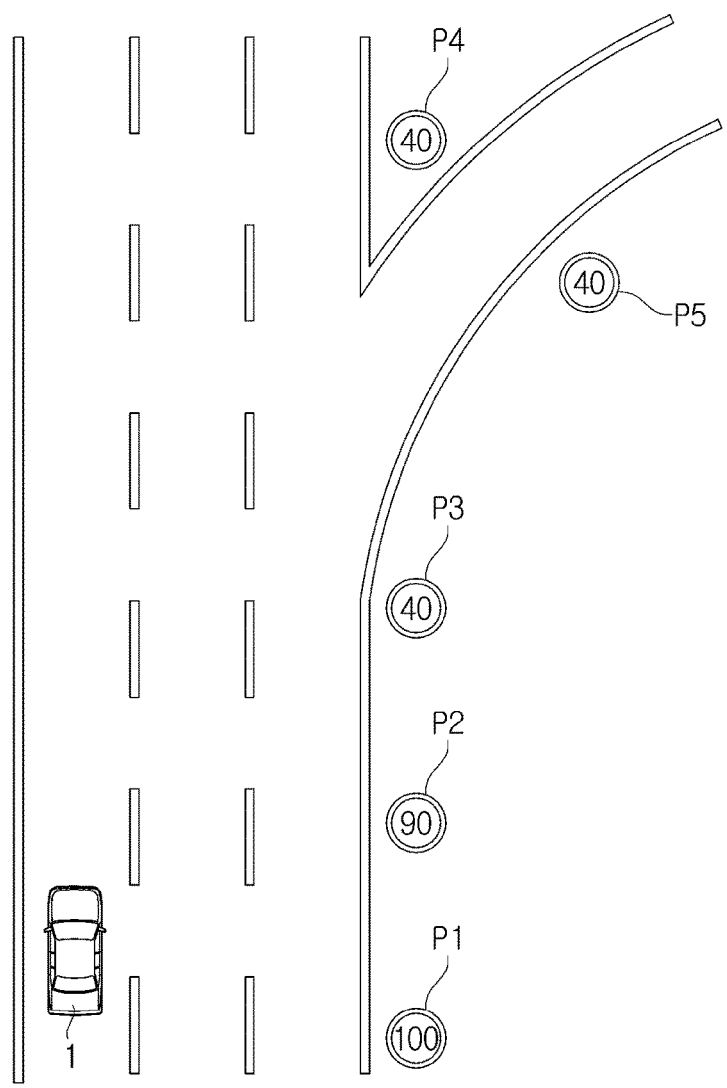
FIG. 4 is a view for describing a case in which a road on which the vehicle travels currently is connected to a branch road through a branch point.
Figure 5:
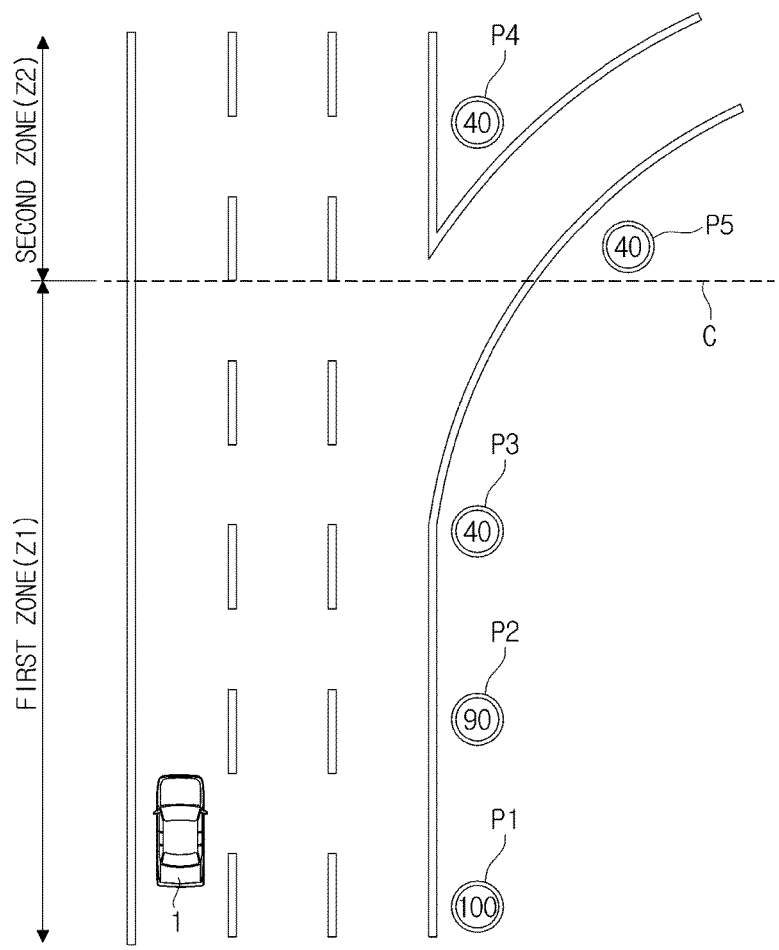
FIG. 5 is a view for describing a case of deciding speed limit information after deciding a first zone and a second zone based on a branch point, according to embodiments of the present disclosure.
Figure 6:
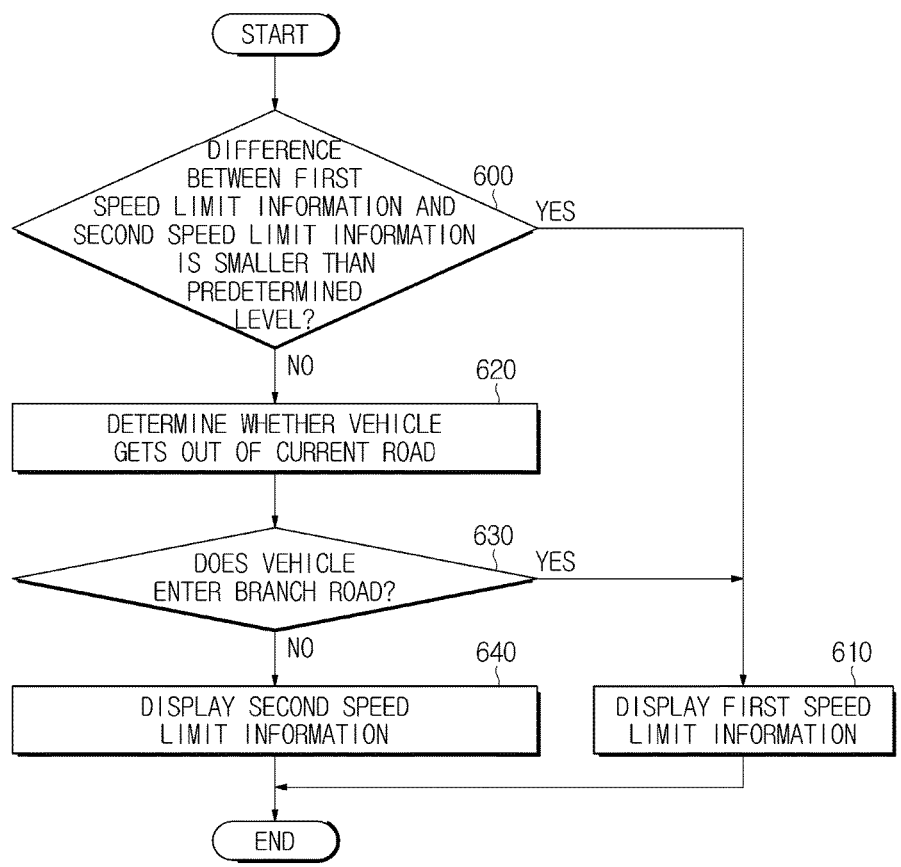
FIG. 6 is a view for describing a method in which the vehicle decides speed limit information to display on a display, when first speed limit information is detected in the first zone, according to embodiments of the present disclosure.
Figure 7:
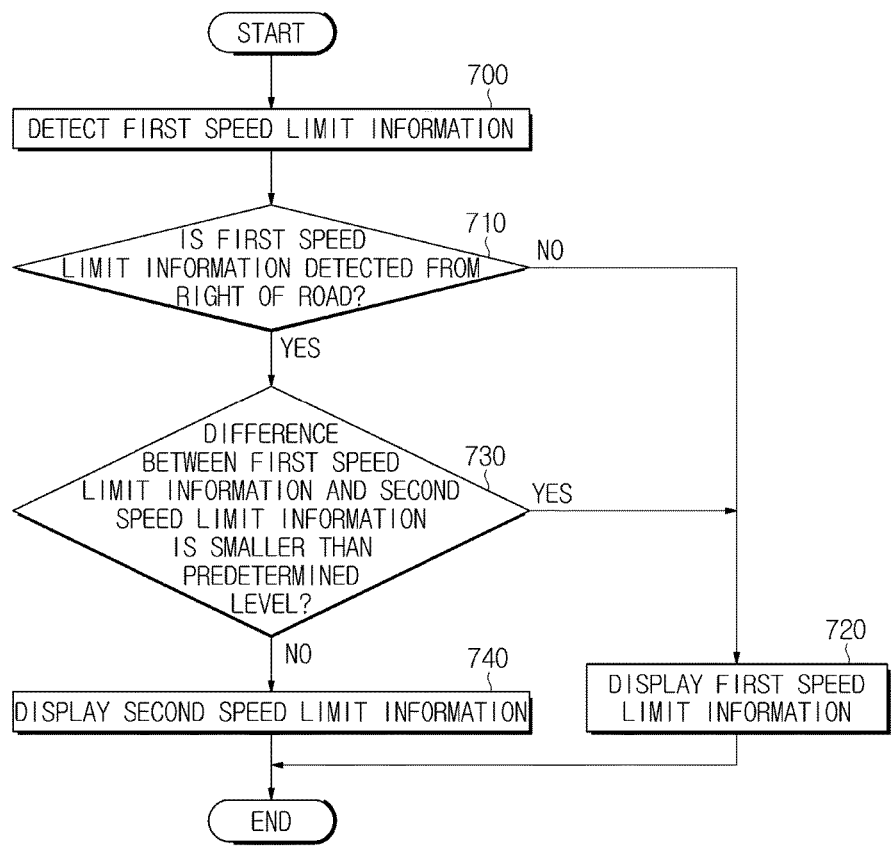
FIG. 7 is a view for describing a method in which the vehicle decides speed limit information to display on the display, when first speed limit information is detected in the second zone, according to embodiments of the present disclosure.
Figure 8:
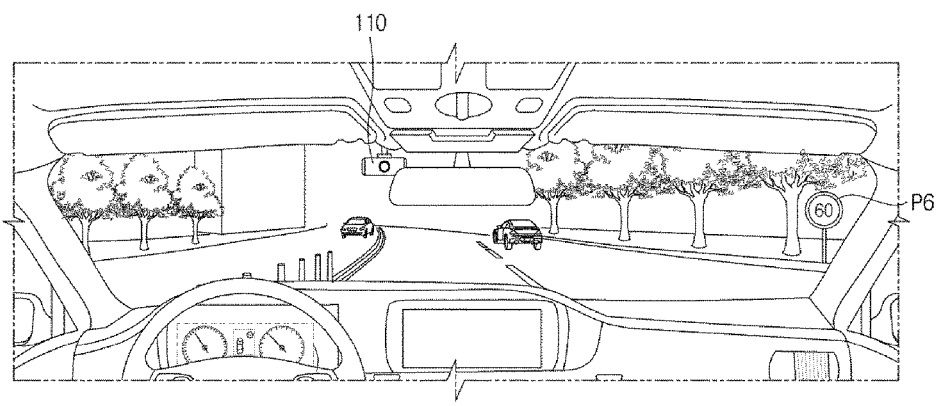
FIG. 8 is a view for describing a method of determining whether a road sign on which speed limit information is written exists at the right side from a road, according to embodiments of the present disclosure.
Figure 9:
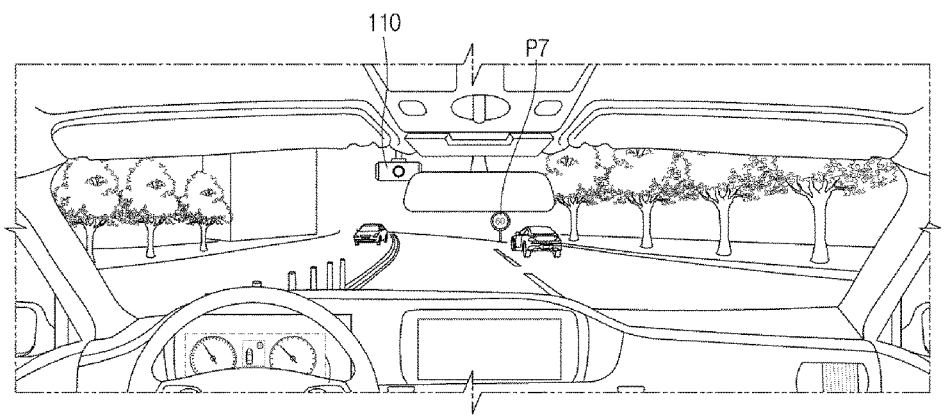
FIG. 9 is a view for describing another method of determining whether a road sign on which speed limit information is written exists at the right side from a road, according to embodiments of the present disclosure.
Figure 10:
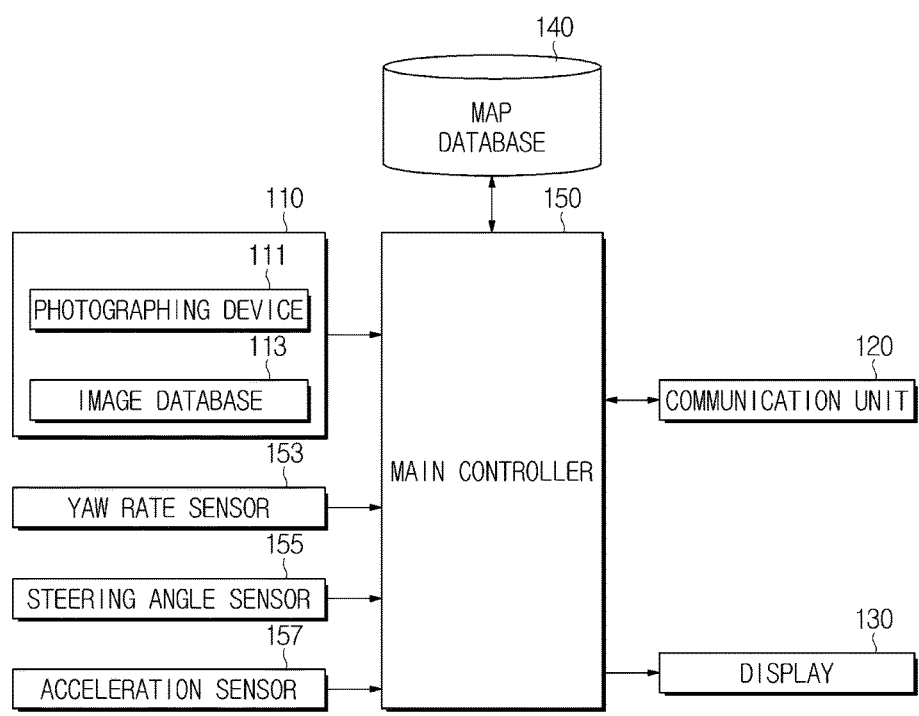
FIG. 10 is another control block diagram of a vehicle according to embodiments of the present disclosure.

FIG. 3 is a control block diagram of a vehicle according to embodiments of the present disclosure, and FIG. 4 is a view for describing a case in which a road on which the vehicle currently travels is connected to a branch road through a branch point. Also, FIG. 5 is a view for describing a case of determining speed limit information after detecting a first zone and a second zone based on a branch point, according to embodiments of the present disclosure, and FIG. 6 is a view for describing a method in which the vehicle determines speed limit information to display on a display, when first speed limit information is detected in the first zone, according to embodiments of the present disclosure. Also, FIG. 7 is a view for describing a method in which the vehicle determines speed limit information to display on the display, when first speed limit information is detected in the second zone, according to embodiments of the present disclosure, and FIG. 8 is a view for describing a method of determining whether a road sign on which speed limit information is written exists at the right side of a road, according to embodiments of the present disclosure. Also, FIG. 9 is a view for describing another method of determining whether a road sign on which speed limit information is written exists at the right side of a road, according to embodiments of the present disclosure, and FIG. 10 is another control block diagram of a vehicle according to embodiments of the present disclosure. The following description will be given by referring to FIGS. 3 to 10 together, in order to avoid redundant description.

As shown in FIG. 3, the vehicle 1 may include map database 140, a position sensor 151, a yaw rate sensor 153, a steering angle sensor (SAS) 155, an acceleration sensor 157, a communication unit 120, and a display 130, in addition to the above-described components.

Hereinafter, the display 130 may be a device capable of displaying various information, such as the display 101, the cluster 144, and the head-up display, as described above, and accordingly, a detailed description thereof will be omitted.

Meanwhile, components included in the vehicle 1 can transmit/receive various information to/from each other through an In-Vehicle Network (IVN). The IVN means a communication network that supports data transmission/reception between various devices included in the vehicle 1.

For example, the IVN may include a Controller Area Network (CAN). Herein, the CAN, which is a vehicle network for providing digital serial communication between the various devices of the vehicle 1, may substitute complicated electrical wiring and relays of electronic devices in the vehicle 1 with serial communication lines to provide real-time communication. However, the IVN is not limited to the above-mentioned examples, and the devices in the vehicle 1 can perform data reception/transmission through various in-vehicle networks known in the related art.

For example, an image controller 112 may receive information collected or measured by at least one of the yaw rate sensor 153, the steering angle sensor 155, and the acceleration sensor 157 through the IVN, and determine whether the vehicle 1 gets out of the current road, based on the received information, which will be described later. Hereinafter, the components of the vehicle 1 will be described in detail.

The position sensor 151 may measure position information of the vehicle 1. The position information means information from which the position of the vehicle 1 can be recognized. For example, the position information may include coordinate information, such as longitude, latitude, and altitude, although not limited to these. That is, the position information may include all information from which the position of the vehicle 1 can be recognized.

Meanwhile, the position sensor 151 may include a Global Positioning System (GPS) capable of measuring a position through artificial satellites, and a Differential Global Positioning System (DGPS) capable of measuring a position with high accuracy to compensate the disadvantages of the GPS, although not limited to these.

Generally, position information transmitted to a GPS on the earth from artificial satellites has errors. For example, if B GPSs (B≥2) are located adjacent to each other, the B GPSs may have similar errors. The DGPS may cancel errors that are common to the B GPSs to thereby obtain more accurate data.

The vehicle 1 according to embodiments of the present disclosure may measure its own position information when acquiring speed limit information through the position sensor 151, map the position information to the speed limit information, and then store the result of the mapping in image database 113. This will be described in detail below.

Also, the vehicle 1 may include the yaw rate sensor 153, as shown in FIG. 3. The yaw rate sensor 153 may measure yaw rate information of the vehicle 1. Herein, the yaw rate information is information about speed at which a rotation angle (yaw rate) changes on a vertical axis corresponding to the center axis of the vehicle 1.

For example, when the vehicle 1 rotates with respect to the vertical axis, a flake fork in the yaw rate sensor 153 may vibrate to electronically measure a yaw rate of the vehicle 1. A cesium crystal device may be installed in the yaw rate sensor 153, and when the vehicle 1 rotates, the cesium crystal device may itself rotate to generate a voltage. The yaw rate sensor 153 may measure a yaw rate of the vehicle 1 based on the generated voltage. Yaw rate information measured by the yaw rate sensor 153 may be transferred through the IVN.

Also, the vehicle 1 may include the steering angle sensor 155. The steering angle sensor 155 may measure a steering angle of the vehicle 1. For example, the steering angle sensor 155 may be installed at the lower end of the steering wheel 12 (e.g., see FIG. 2) to detect a steering angle of the steering wheel 12. Steering angle information measured by the SAS 155 may be transferred through the IVN.

The vehicle 1 may further include the acceleration sensor 157. The acceleration sensor 157 may measure the acceleration of the vehicle 1. Acceleration information measured by the acceleration sensor 157 may be transferred through the IVN. Meanwhile, the vehicle 1 may include the communication unit 120 that can transmit/receive various data to/from an external device.

The communication unit 120 may transmit/receive various data to/from an external device through a wired/wireless communication network. For example, the communication unit 120 may include at least one of a wired communication module and a wireless communication module. Herein, the wired communication module means a module to support a wired communication method. The wired communication method may include a method of transmitting and receiving wired signals through a wired cable, such as a High Definition Multimedia Interface (HDMI), a Peripheral Component Interconnect (PCI), PCI-express, Universe Serial Bus (USB), and the like. Also, the wired communication method may include various wired communication methods that are known to those skilled in the related art.

The wireless communication module means a module to support a wireless communication method. The wireless communication method may include a wireless communication method of transmitting/receiving wireless signals through a base station, such as Long-Term Evolution (LTE), LTE-Advanced (LTE-A), Code Division Multiple Access (CDMA), Wideband CDMA (WCDMA), etc., and a method of transmitting/receiving wireless signals to/from external devices located within a predetermined distance, such as Wireless LAN (WLAN), Wireless-Fidelity (Wi-Fi), Bluetooth, Z-wave, Zigbee, Bluetooth Low Energy (BLE), Near Field Communication (NFC), etc. Herein, the wireless signals may include voice call signals, video call signals, or various formats of data according to transmission/reception of text/multimedia messages.

The wired communication module may correspond to an Integrated Chip (IC) or an IC package into which communication modules supporting one or more wired communication methods are integrated, or the wireless communication module may correspond to an IC or an IC package into which communication modules supporting one or more wireless communication methods are integrated. In the following description, for convenience of description, the wired communication network and the wireless communication network will be simply referred to as a communication network as long as they do not need to be distinguished from each other.

For example, the communication unit 120 may receive map data from an external server through a communication network to update the map database 140. The communication unit 120 may update map data stored in the map database 140 by receiving a user's command or according to a predetermined update cycle.

The vehicle 1 may include the map database 140. The map database 140 may be installed in the navigation terminal 100, or installed in the vehicle 1, separately from the navigation terminal 100 (e.g., see FIG. 2).

The map database 140 may store map data. The map database 140 may be implemented through at least one type of storage medium among a flash memory type, a hard disk type, a multimedia card micro type, a card type memory (for example, a Secure Digital (SD) card or an eXtreme Digital (XD) card), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk. However, the storage medium is not limited to the above-mentioned examples, and may be implemented as another type known in the related art.

The map data may include various kinds of information, such as roads and buildings, which can represent a map, and may also include information about Point Of Interest (POI). Also, the map data may include information about roads included in a map. The information about roads may be information related to the driving environments of the roads. For example, the information about roads may include information about the locations of speed bumps, information about regions at which traffic accidents occur often, information about speed limits of the roads, etc. Also, the information about roads may include information about the total widths of the roads, information about a lane width, etc.

The map database 140 may store map data about all regions or map data about some regions. The vehicle 1 may receive map data which it needs from an external server, etc. through the communication unit 120 to use the map data.

The vehicle 1 may include the image information acquiring apparatus 110, as described above. According to embodiments of the present disclosure, the image information acquiring apparatus 110 may be located at a head lining 13 of the vehicle 1, as shown in FIG. 2. However, the image information acquiring apparatus 110 may be disposed at any location as long as it can photograph a front view of the vehicle 1.

Referring next to FIG. 3, the image information acquiring apparatus 110 may include a photographing device 111, an image controller 112, and image database 113. The photographing device 111 may acquire image information of a front view of the vehicle 1. Herein, the "front" means a direction in which a driver looks the front window 87 (e.g., see FIG. 2) in the inside of the vehicle 1. The image information may include various objects, such as roads, lanes drawn on the roads, guide rails, road signs, adjacent vehicles, trees around the roads, traffic lights, etc.

Various data detected from the image information may be stored in the image database 113. For example, speed limit information detected from a road sign included in the image information may be stored in the image database 113. The speed limit information may be mapped to information about the position of the vehicle 1 when the image information is acquired, and stored in the image database 113. The information about the position of the vehicle 1 may be measured by the position sensor 151, as described above.

Also, speed limit information may be mapped to the information about the road detected from the image information, for example, the total width of the road, the lane width, etc., and stored in the image database 113. The speed limit information, the total width of the road, the land width, etc. may be detected by the image controller 112 that performs image processing through an image processing process.

The image database 113 may be implemented as at least one type of storage medium among a flash memory type, a hard disk type, a multimedia card micro type, a card type memory, RAM, SRAM, ROM, EEPROM, PROM, magnetic memory, a magnetic disk, and an optical disk. However, the image database 113 is not limited to the above-mentioned examples, and may be implemented as another type known in the related art.

The image controller 112 may control overall operations of the image information acquiring apparatus 110. For example, the image controller 112 may generate a control signal, and control the photographing device 111 through the control signal. The image controller 112 may be implemented through a processor, such as a Micro Control Unit (MCU), which performs various operations and control processes. Also, the image controller 112 may be implemented through various processors known in the related art. The image controller 112 may recognize a road sign from image information through an image processing process, and detect speed limit information of a road, written on the recognized road sign. The road sign means an object located above or around the road to inform the speed limit of the road.

Speed limit information may be different according to roads, or some roads may have the same speed limit information. Also, the same road may have different speed limit information at different regions. For example, the speed limit information of a road may change according to various causes, such as road-widening or country traffic rules.

A function of providing speed limit information in the vehicle 1 relates to safety for passengers. Accordingly, it is important to provide accurate speed limit information. However, since the map database 140 needs to be updated by a communication network or a user through the storage medium, the map database 140 cannot reflect the environment of a real road in real time. Accordingly, the image controller 112 according to embodiments of the present disclosure may deduce speed limit information of a road from image information to provide a user with more accurate speed limit information.

When the vehicle 1 travels, the image controller 112 may control the photographing device 111 through a control signal to continue to acquire image information. Alternatively, the image controller 112 may control the photographing device 111 through a control signal to acquire image information at predetermined time intervals. The image controller 112 may store the speed limit information detected through the image processing process in the image database 113. The image controller 112 may map at least one of information about the position of the vehicle 1 when the image information is acquired, the total width of the road, and the lane width to the speed limit information, and store the result of the mapping in the image database 113, as described above.

Hereinafter, for convenience of description, speed limit information stored in advance in the image database 114 or the map database 140 will be referred to as second speed limit information. Also, speed limit information which is detected by the image controller 112 from image information and which is to be compared to the second speed limit information will be referred to as firs speed limit information.

First speed limit information of a road deduced by the image controller 112, which is speed limit information of a road on which the vehicle 1 travels currently or a branch road, may be identical to or different from the second speed limit information.

If the first speed limit information is identical to the second speed limit information, the image controller 112 may control the display 130 to continue to display speed limit information, without having to perform a process of deciding speed limit information. However, if the first speed limit information is different from the second speed limit information, it is difficult to accurately determine whether the speed limit information of the road on which the vehicle 1 travels currently has changed to the first speed limit information from the second speed limit information or whether the first speed limit information is speed limit information of a branch road.

For example, referring to FIG. 4, when the vehicle 1 travels, the image controller 112 may detect speed limit information of 100 km/h written on a first road sign P1 from first image information, and store the speed limit information of 100 km/h in the image database 113. Accordingly, the image controller 112 may control the display 130 through a control signal to display the speed limit information of 100 km/h.

As the vehicle 1 continues to travel, the image controller 112 may detect speed limit information written on second, third, fourth, and fifth road signs P2, P3, P4, and P5 from second, third, fourth, and fifth image information, sequentially, as shown in FIG. 4.

When the vehicle 1 passes the first road sign P1 and the second road sign P2, the vehicle 1 may have difficulties in deciding whether to display which one of first speed limit information of 100 km/h detected from the first image information and stored in advance and second speed limit information of 90 km/h detected from second image information on the display 130. In other words, the vehicle 1 may have difficulties in finding out a cause that speed limit information has changed from the first speed limit information, for example, 100 km/h detected from the first road sign P1 to speed limit information of 90 km/h detected from the second road sign P2 or to speed limit information of 40 km/h detected from the third road sign P3 on the same road.

If an arrow is written on a road sign on which speed limit information is written, the vehicle 1 can recognize the arrow through an image processing process to easily determine whether the speed limit information is speed limit information of a branch road or speed limit information of the road on which the vehicle 1 travels currently. However, if the road sign has no identifier such as an arrow indicating a direction, the vehicle 1 may have difficulties in determining whether the speed limit information is speed limit information of a branch road or changed speed limit information of a road on which the vehicle travels currently.

For example, referring to FIG. 4, speed limit information written on the first road sign P1 and speed limit information written on the second road sign P2 are speed limit information of the road on which the vehicle 1 travels currently. That is, FIG. 4 shows a case in which the speed limit information of the road on which the vehicle 1 travels currently changes from 100 km/h to 90 km/h. According to another example, speed limit information written on the third, fourth, and fifth road signs P3, P4, and P5 of FIG. 4 may be speed limit information of a branch road.

According to embodiments of the present disclosure, the image controller 112 may determine whether a difference between the first speed limit and the second speed limit exceeds a predetermined level. The image controller 112 may decide speed limit information that is to be displayed on the display 130, based on the result of the determination. Accordingly, the image controller 112 can accurately determine whether the first speed limit information written on the road sign is speed limit information of the road on which the vehicle 1 travels currently or speed limit information of the branch road, and display accurate speed limit information on the display 130.

At this time, the image controller 112 may perform different processes of deciding speed limit information, based on information about the position of the vehicle 1. For example, although the difference between the first speed limit information and the second speed limit information exceeds the predetermined level, speed limit information displayed on the display 130 before the vehicle 1 arrives at a branch point may be identical to or different from speed limit information displayed on the display 130 after the vehicle 1 passes the branch point.

The image controller 112 may set a plurality of zones based on a branch point, and set different processes of deciding speed limit information that is to be displayed on the display 130 for the individual zones. For example, the image controller 112 may set a first zone Z1 ranging from a branch point C to a point located at a predetermined distance before the branch point C, and a second zone Z2 ranging from the branch point C to another point located at a predetermined distance after the branch point C, in the traveling direction of the vehicle, as shown in FIG. 5.

According to embodiments of the present disclosure, the image controller 112 may set a zone ranging from a branch point to a point located at 100 m before the branch point, to a first zone, and set a zone ranging from the branch point to another point located at 20 m after the branch point, to a second zone, although not limited to this. Since the image controller 112 can recognize information about the position of the vehicle 1 when image information is acquired through the position sensor 151, as described above, the image controller 112 may determine whether the vehicle 1 is located in the first zone Z1 or in the second zone Z2 when the image information is acquired. Hereinafter, a method of deciding speed limit information in the first zone Z1 will be described.

Referring next to FIG. 6, the image controller 112 may control the display 130 to display pre-stored second speed limit information. The second speed limit information, which is speed limit information stored in advance in the map database 140, may be speed limit information corresponding to position information of the vehicle 1. Or, the second speed limit information, which is speed limit information stored in advance in the image database 1230, may be speed limit information detected from the same road on which the vehicle 1 travels currently before the vehicle 1 arrives at the first zone, and stored in advance. For example, the second speed limit information may be speed limit information written on a road sign located at 300 m before an entrance point of the first zone Z1, although not limited to this.

If first speed limit information is detected in the first zone while the vehicle 1 travels, the image controller 112 may determine whether a difference between the first speed limit information and the second speed limit information is smaller than a predetermined level, in operation 600. For example, the image controller 112 may determine whether a difference between the first speed limit information and the second speed limit information is smaller than 20 km/h, although not limited to this.

If the image controller 112 determines that the difference between the first speed limit information and the second speed limit information is smaller than the predetermined level, the image controller 112 may determine that speed limit information of the road on which the vehicle 1 travels currently has changed from the second speed limit information to the first speed limit information. In other words, if the image controller 112 determines that the difference between the first speed limit information and the second speed limit information is smaller than the predetermined level, the image controller 112 may determine that the detected first speed limit information corresponds to speed limit information of the road on which the vehicle 1 travels currently, and that speed limit information of the road on which the road travels currently has changed from the second speed limit information to the first speed limit information.

The predetermined level may have been set in advance by a user or a designer. For example, the predetermined level may be set according to a difference in average limit speed between the branch road connected through the branch point and the road on which the vehicle 1 travels currently. Or, the predetermined level may be set by reflecting a difference in real limit speed between the branch road and the road on which the vehicle 1 travels currently.

Accordingly, the image controller 112 may control the display unit 130 to display the first speed limit information, instead of the second speed limit information, in operation 610. Also, the image controller 112 may update speed limit information stored in advance in the image database 112 from the second speed limit information to the first speed limit information.

However, if the image controller 112 determines that the difference between the first speed limit information and the second speed limit information exceeds the predetermined level, there is high probability that the first speed limit information is speed limit information of the branch road, not the road on which the vehicle 1 travels currently. Accordingly, the image controller 112 may determine whether the driver intends to drive the vehicle 1 to the branch road, and decide speed limit information that is to be displayed on the display 130 between the first speed limit information and the second speed limit information, according to the result of the determination.

At this time, the image controller 112 may determine the driver's driving intention, that is, whether the vehicle 1 gets out of the current road, using various parameters, in operation 620. For example, the image controller 112 may determine whether the vehicle 1 changes lanes, from image information, through an image processing process. Accordingly, if the image controller 112 determines that the vehicle 1 has changed J lanes (J≥1) or more in the first zone Z1, the image controller 112 may determine that the vehicle 1 will get out of the road on which it travels currently, and control the display 130 to display the first speed limit information.

According to embodiments of the present disclosure, the image controller 112 may recognize at least one of the total width of the road on which the vehicle 1 travels currently and a lane width, from the image information, through the image processing process. Also, the image controller 112 may recognize at least one of the total width of the road on which the vehicle 1 travels currently and a lane width, from data stored in advance in the map database 140 or the image database 123.

If the image controller 112 determines that the vehicle 1 has changed a predetermined number of lanes or more, based on the total width of the road and the lane width, the image controller 112 may determine that the vehicle 1 intends to exit the road on which it travels currently. The predetermined number of lane changes may be set according to the number of lanes constituting each road. For example, map data may include the number of lanes of each road. Or, the number of lanes of each road may be calculated based on the total width of the road and the lane width, detected from the image information.

However, there is a case in which image information includes various objects or in which the total width of a road cannot be detected due to a field-of-view restriction. Accordingly, the predetermined number may be set to L or more (L≥2). In this case, the image controller 112 may perform an image processing process on the image information to detect only the number of lanes which the vehicle 1 changes.

Also, the image controller 112 may receive information about various parameters from a component in the vehicle 1 to determine whether the vehicle 1 gets out of the road on which it travels currently. For example, the image controller 112 may receive information about the acceleration of the vehicle 1 from the acceleration sensor 157. Accordingly, the image controller 112 may determine whether the vehicle 1 gets out of the current road, based on the acceleration of the vehicle 1 or a rate of change of the acceleration of the vehicle 1 in the first zone. Generally, when the driver intends to enter a branch road, the driver will decelerate the vehicle 1. The image controller 112 may detect a degree of deceleration based on deceleration information received from the acceleration sensor 157 to determine whether the vehicle 1 gets out of the current road.

According to another example, the image controller 112 may receive yaw rate information from the yaw rate sensor 153. Accordingly, if the yaw rate of the vehicle 1 changes to a predetermined level or more in the first zone Z1, the image controller 112 may determine that the vehicle 1 gets out of the current road.

According to another example, the image controller 112 may receive steering angle information from the steering angle sensor 155. Accordingly, if the steering angle of the vehicle 1 changes to a predetermined level or more in the first zone, the image controller 112 may determine that the vehicle 1 gets out of the current road.

The image controller 112 may combine at least one of information collected by the acceleration sensor 157, the yaw rate sensor 153, and the steering sensor 155, based on the result deduced from image information, to determine whether the vehicle 1 gets out of the current road, and to decide speed limit information that is to be displayed, according to the result of the determination.

If the image controller 112 determines that the vehicle 1 enters the branch road, in operation 630, the image controller 112 may control the display 130 to display the first speed limit information. That is, the image controller 112 may control the display 130 to display the first speed limit information, instead of the second speed limit information, in operation 610. Also, if the image controller 112 determines that the vehicle 1 intends to continue to travel on the road on which it travels currently, in operation 630, the image controller 112 may control the display 130 to continue to display the second speed limit information, in operation 640.

Typically, when the vehicle 1 enters a branch road, it is difficult to immediately determine whether the vehicle 1 enters the branch road. Particularly, if a GPS is installed as a position sensor in the vehicle 1, determination on whether the vehicle 1 enters the branch road may be late since the GPS has a wide error range. Accordingly, there occurs a case in which a map and speed limit information displayed on the display 130 cannot reflect a real situation.

The vehicle 1 according to the current embodiment may determine whether the vehicle 1 enters a branch road, more quickly, based on the first speed limit information detected from the image information and the result of determination on whether the vehicle 1 gets out of the current road, that is, the result of determination on the driver's driving intention. Accordingly, the vehicle 1 can provide more accurate map data, while displaying more accurate speed limit information on the display 130. Also, the vehicle 1 may determine whether it enters a branch road, more quickly, based on position information measured by the position sensor 151, in addition to the first speed limit information detected from image information and the result of determination on whether the vehicle 1 is no longer traveling on the current road, although not limited to this.

Hereinafter, a method of determining speed limit information that is to be displayed on the display 130 when first speed limit information is detected in the second zone Z2 will be described.

The image controller 112 may acquire image information in the second zone, and detect first speed limit information from the image information through the image processing process, in operation 700. Also, the image controller 112 may determine whether a road sign from which the first speed limit information is detected is located at the right or left side of a road, through the image processing process, in operation 710.

The location of a road sign may depend on country traffic rules. If the steering wheel 12 is located to the left in the inside of the vehicle 1, as shown in FIG. 2, a road sign may be located at the right side of a road, and in the case of a branch road, a road signal may be located at the right or left side of the branch road. Hereinafter, a case in which the steering wheel 12 is located to the left in the inside of the vehicle 1, and a road sign is located at the left side of a branch road will be described, however, the embodiments are not limited to this example.

The image controller 112 may determine whether a road sign is located at the left or right side from a road, through various methods. That is, the image controller 112 may determine whether a road sign from which the first speed limit information is detected based on image information is located at the right or left side from a road, through various image processing processes.

For example, the image controller 112 may recognize a road and a road sign from image information, through an image processing process. Accordingly, the image controller 112 may determine whether the road sign is located at the left or right side of the road, based on a relative location relationship between the recognized road and the recognized road sign.

Meanwhile, the method of determining the position of the sign is not limited to the above-described method. For example, the image controller 112 may determine the location of the road sign, based on at least one of the location of the road sign and the size of the road sign, recognized from the image information.

Referring next to FIG. 8, the vehicle 1 may include an image information acquiring apparatus 100 to acquire image information of a front view of the vehicle 1 when the vehicle 1 travels, as described above. The image information acquiring apparatus 100 may be configured to photograph a front view of the vehicle 1, as shown in FIG. 8. The image information may include various objects, such as another vehicle, a road, and a sixth road sign P6. In the image information acquired in a situation described above with reference to FIG. 6, the sixth road sign P6 may be recognized at the right side from a predetermined location. In this case, the image controller 112 may determine that the sixth road sign P6 is located at the right side from the road, without having to determine a relative location relationship between the road and the road sign. The predetermined location may be a reference location with respect to which a road sign can be determined to be located at the right side from a road, regardless of determination on a relative location relationship between the road and the road sign, and may be set according to the location of the image information acquiring apparatus 100 in the inside of the vehicle 1, a road sign installation location for each country, etc.

According to another example, the image controller 112 may determine the location of the road sign, based on the location of the road sign and the size of the road sign, recognized from image information.

Referring next to FIG. 9, a seventh road sign P7 may be located in a center area compared to the sixth road sign P6 of FIG. 8 on the image information. Also, the size of the seventh road sign P7 on the image information may be smaller than that of the sixth road sign P6 of FIG. 8 on the image information. In this case, the image controller 112 may determine whether the seventh road sign P7 is located at the right side from the road, in consideration of information about the location of the seventh road sign P7 and information about the size of the seventh road sign P7. However, the image controller 112 may determine whether the seventh road sign P7 is located at the right side from the road, using any other method.

If the image controller 112 determines that a location from which the first speed limit information is detected, that is, a road sign is located at the left side from the road, the image controller 112 may determine that the vehicle 1 enters a branch road, and control the display 130 to display the first speed limit information, in operation 720.

If the image controller 112 determines that a location from which the first speed limit information is detected, that is, a road sign is located at the right side from a road, the image controller 112 may determine whether a difference between the first speed limit information and the second speed limit information is smaller than a predetermined level, in operation 730.

If the image controller 112 determines that the difference between the first speed limit information and the second speed limit information is smaller than the predetermined level, the image controller 112 may determine that speed limit information has changed from the second speed limit information to the first speed limit information. Accordingly, the image controller 112 may control the display 130 through a control signal to display the first speed limit information, in operation 720.

If the image controller 112 determines that the difference between the first speed limit information and the second speed limit information exceeds the predetermined level, the image controller 112 may determine that speed limit information has changed from the first speed limit information to the second speed limit information. Accordingly, the image controller 112 may control the display 130 through a control signal to display the second speed limit information, in operation 740.

For example, there is a case in which when the vehicle 1 travels on the same road in the second zone Z2 (e.g., see FIG. 5) and second speed limit information of 90 km/h is displayed on the display 130, the image controller 112 recognizes a fourth road sign P4 to detect first speed limit information of 40 km/h. In this case, the image controller 112 may determine that a difference (that is, 50 km/h) between the first speed limit information detected at the right side from the road and the second speed limit information exceeds a predetermined level, for example, 20 km/h. Then, the image controller 112 may control the display 130 to continue to display the second speed limit information of 90 km/h.

According to another example, there is a case in which when the vehicle 1 enters a branch road in the second zone Z2 (e.g., see FIG. 5), the second speed limit information of 90 km/h is still displayed on the display 130 due to the error range of location information, and the image controller 112 recognizes the fourth road sign P4 to detect first speed limit information of 40 km/h. In this case, the image controller 112 may control the display 130 to display the first speed limit information detected at the left side from the road.

Referring next to FIG. 10, the vehicle 1 may include a main controller 150 to control overall operations of the components in the vehicle 1. The main controller 150 may include a processor such as MCU, and generate control signals to control overall operations of the components in the vehicle 1. The image controller 112 of FIG. 3 may be included in the main controller 150. Accordingly, the main controller 150 can perform the above-described operations of the image controller 112 of FIG. 3, and accordingly, detailed descriptions about components shown in FIG. 10 will be omitted.

Also, unlike FIG. 10, the vehicle 1 may further include the image controller 112, in addition to the main controller 150, to perform the above-described operations together with the main controller 150. For example, operation of deciding speed limit information may be performed by the image controller 112, and operation of controlling the display 130 based on the result of the decision may be performed by the main controller 150. Hereinafter, the operation flow of the vehicle 1 will be described briefly.

Figure 11:
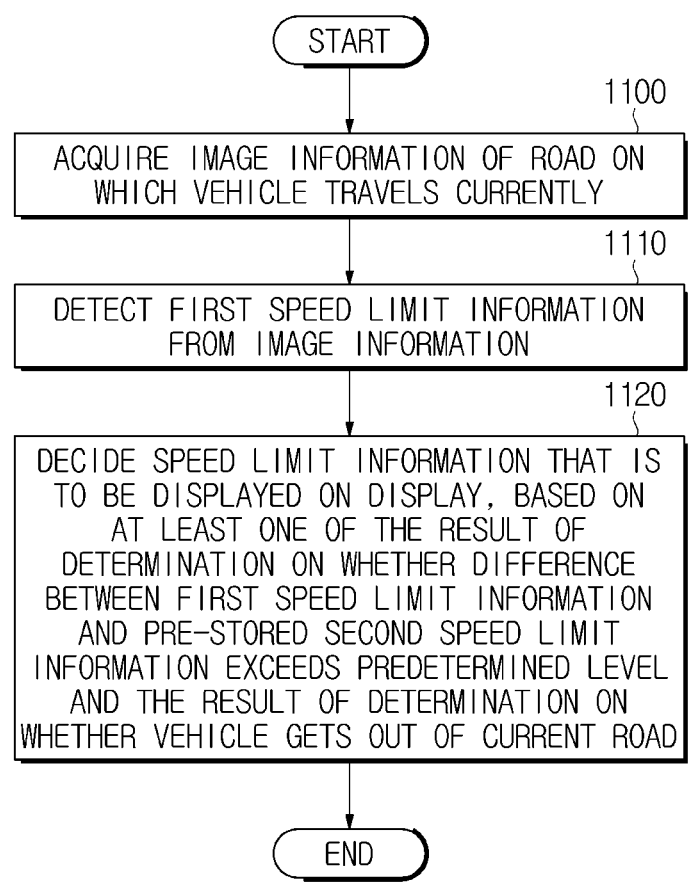
FIG. 11 is a view for briefly describing the operation flow of a vehicle of determining speed limit information that is to be displayed on a display.

FIG. 11 is a view for briefly describing the operation flow of a vehicle of determining speed limit information that is to be displayed on a display, based on at least one of a difference between first speed limit information and second speed limit information and the result of determination on whether the vehicle no longer travels on a road on which it travels currently.

A vehicle according to embodiments of the present disclosure may acquire image information of a road on which it travels currently, through an image information acquiring apparatus, in operation 1100. The image information acquiring apparatus may be mounted on the head lining (13 of FIG. 2) of the vehicle, as described above, to photograph a front view of the vehicle, thereby acquiring image information.

The vehicle may detect first speed limit information from the acquired image information, in operation 1110. The first speed limit information may correspond to speed limit information acquired by the image information acquiring apparatus from the road on which the vehicle travels currently, and second speed limit information may be speed limit information stored in advance in map database or image data, more specifically, speed limit information acquired previously from the road on which the vehicle travels currently and stored.

For example, when a driver drives the vehicle on a road 1, speed limit information acquired at first time may be first speed limit information, and speed limit information acquired before the first time, for example, acquired M (M≥1) seconds earlier than the first time may be second speed limit information. Or, the second speed limit information may be speed limit information corresponding to a location at which the vehicle travels currently, among speed limit information stored in advance in the map database.

Speed limit information of a road may change as described above. For example, the speed limit of the same road K (K≥1) may change according to a road environment. Particularly, when a branch point exists on a road, a road sign for informing speed limit information of a branch road connected to the road through the branch point, and a road sign for informing speed limit information of the road on which the vehicle travels currently may coexist on the road. In this case, it is difficult to determine whether speed limit information detected through a road sign appearing on the road is speed limit information of the road or speed limit information of the branch road, and when the detected speed limit information is different from pre-stored speed limit information, it is difficult to determine whether the detected speed limit information is changed speed limit information of the same road.

Accordingly, the vehicle may decide speed limit information that is to be displayed on the display, based on at least one of the result of determination on whether a difference between the first speed limit information and the second speed limit information exceeds a predetermined level and the result of determination on whether the vehicle is no longer traveling on the road, in operation 1120. For example, the vehicle may determine whether the first speed limit information represents speed limit information of another road, for example, the branch road, depending on whether the difference between the first speed limit information and the second speed limit information exceeds the predetermined level.

If the vehicle determines that the difference between the first speed limit information and the second speed limit information is smaller than the predetermined level, the vehicle may determine that the first speed limit information is speed limit information of the road on which the vehicle travels currently. Also, the vehicle may determine that the speed limit information of the road on which the vehicle travels currently has changed from the second speed limit information to the first speed limit information. Accordingly, the vehicle may control the display to display the first speed limit information.

According to another example, if the vehicle determines that the difference between the first speed limit information and the second speed limit information exceeds the predetermined level, the vehicle may determine that the first speed limit information is speed limit information of the branch road. In this case, if the vehicle determines that a driver intends to drive the vehicle to the branch road, the vehicle may control the display to display the first speed limit information. However, if the vehicle determines that the driver intends to continue to drive the vehicle on the road on which the vehicle travels currently, the vehicle may control the display to display the second speed limit information. In other words, by determining the driver's driving intention, that is, whether the vehicle enters a branch road, in addition to determination on whether the first speed limit information relates to the road on which the vehicle travels currently or the branch road, and deciding speed limit information that is to be displayed on the display based on the results of the determination, the driver's confusion can be prevented.

At this time, the vehicle may determine whether it gets out of the road on which it travels currently, through various methods. For example, the vehicle may determine whether it gets out of the road, using information measured by at least one of the acceleration sensor, the steering angle sensor, and the yaw rate sensor installed therein. According to another example, the vehicle may apply an image processing process to image information to determine whether it changes lanes. Details about the examples have been described above, and accordingly, further descriptions thereof will be omitted.

According to embodiments of the present disclosure, it is possible to decide speed limit information more suitable for a situation, based on the result of determination related to a difference between detected speed limit information and pre-stored speed limit information and the result of determination on whether the vehicle gets out of a road on which it travels currently.

Additionally, according to embodiments of the present disclosure, by quickly determining whether a driver enters a branch road, it is possible to display map data reflecting a real driving situation on the display.

Although embodiments have been described by specific examples and drawings, it will be understood to those of ordinary skill in the art that various adjustments and modifications are possible from the above description. For example, although the described techniques are performed in a different order, and/or the described system, architecture, device, or circuit component are coupled or combined in a different form or substituted/replaced with another component or equivalent, suitable results can be achieved. Therefore, other implementations, other embodiments, and things equivalent to claims are within the scope of the claims to be described below.

What is claimed is:

1. A vehicle comprising:
   a display;
   a photographing device configured to acquire image information of a road on which the vehicle currently travels; and
   a main controller configured to: i) detect first speed limit information based on the acquired image information, ii) calculate a difference between the detected first speed limit information and pre-stored second speed limit information corresponding to the road on which the vehicle currently travels, iii) display the first speed limit information when the calculated difference is less than a predetermined level or when the vehicle enters a branch road, and iv) display the second speed limit information when the calculated difference exceeds the predetermined level and when the vehicle does not enter the branch road.

2. The vehicle according to claim 1, wherein the second speed limit information is pre-stored among a plurality of pre-stored speed limit information in a map database or an image database.

3. The vehicle according to claim 1, further comprising a position sensor configured to measure position information of the vehicle,
   wherein the main controller is further configured to: i) detect a location of the vehicle based on the measured position information, ii) determine whether the vehicle is located in either a first zone ranging from a branch point existing on the road on which the vehicle currently travels to a point located at a predetermined distance before the branch point or a second zone ranging from the branch point to another point located at a predetermined distance after the branch point in the traveling direction of the vehicle.

4. The vehicle according to claim 1, wherein the main controller is further configured to update an image database to change speed limit information of the road on which the vehicle currently travels from the second speed limit information to the first speed limit information.

5. The vehicle according to claim 3, wherein, when the main controller determines that the vehicle is located in the first zone, that the difference between the first speed limit information and the second speed limit information exceeds the predetermined level, and that the vehicle enters the branch road, the main controller is further configured to change the speed limit information that is to be displayed on the display from the second speed limit information to the first speed limit information.

6. The vehicle according to claim 3, wherein when the main controller determines that the vehicle is located in the second zone, the main controller is further configured to determine the speed limit information that is to be displayed on the display by recognizing a location of a road sign on which the first speed limit information is written from the acquired image information.

7. The vehicle according to claim 3, wherein, when the main controller determines that the vehicle is located in the second zone, and that a road sign on which the first speed limit information is written, detected from the acquired image information, is located at a right side of the road on which the vehicle currently travels, the main controller is further configured to determine the speed limit information that is to be displayed on the display based on whether the difference between the first speed limit information and the second speed limit information exceeds the predetermined level.

8. The vehicle according to claim 3, wherein, when the main controller determines that the vehicle is located in the second zone, and that a road sign on which the first speed limit information is written, detected from the acquired image information, is located at a right side of the road on which the vehicle currently travels, the main controller is further configured to change the speed limit information that is to be displayed on the display from the second speed limit information to the first speed limit information.

9. The vehicle according to claim 1, wherein the main controller is further configured to perform image processing on the acquired image information to calculate a number of lane changes and determine whether the vehicle enters the branch road based on a number of lane changes.

10. The vehicle according to claim 1, further comprising a yaw rate sensor configured to measure yaw rate information of the vehicle,
   wherein the main controller is further configured to compare the measured yaw rate information to a predetermined level and determine whether the vehicle enters the branch road based on whether the yaw rate information exceeds the predetermined level.

11. The vehicle according to claim 1, further comprising a steering angle sensor configured to measure steering angle information of the vehicle,
   wherein the main controller is further configured to compare the measured steering angle information to a predetermined level and determine whether the vehicle enters the branch road based on whether the steering angle information exceeds the predetermined level.

12. The vehicle according to claim 1, further comprising an acceleration sensor configured to measure acceleration information of the vehicle,
wherein the main controller is further configured to determine whether the vehicle enters the branch road based on the measured acceleration information.

13. An image information acquiring apparatus comprising:
a photographing device configured to acquire image information of a road on which the vehicle currently travels; and
an image controller configured to configured to: i) detect first speed limit information based on the acquired image information, ii) calculate a difference between the first speed limit information and pre-stored second speed limit information corresponding to the road on which the vehicle currently travels, iii) display the first speed limit information when the calculated difference is less than a predetermined level or when the vehicle enters a branch road, and iv) display the second speed limit information when the calculated difference exceeds the predetermined level and when the vehicle does not enter the branch road.

14. The image information acquiring apparatus according to claim 13, wherein the second speed limit information is pre-stored among a plurality of pre-stored speed limit information in a map database or an image database.

15. The image information acquiring apparatus according to claim 13, wherein the image controller is further configured to: i) detect a location of the vehicle based on position information measured by a position sensor, ii) determine whether the vehicle is located in either a first zone ranging from a branch point existing on the road on which the vehicle currently travels to a point located at a predetermined distance before the branch point or a second zone ranging from the branch point to another point located at a predetermined distance after the branch point in the traveling direction of the vehicle.

16. The image information acquiring apparatus according to claim 15, wherein, when the image controller determines that the vehicle is located in the second zone, the image controller is further configured to determine the speed limit information that is to be displayed on the display by recognizing a location of a road sign on which the first speed limit information is written from the acquired image information.

17. A method of controlling a vehicle, the method comprising:
acquiring image information of a road on which the vehicle currently travels using a photographing device;
detecting first speed limit information based on the acquired image information;
calculating a difference between the first speed limit information and pre-stored second speed limit information corresponding to the road on which the vehicle currently travels;
displaying the first speed limit information when the calculated difference is less than a predetermined level or when the vehicle enters a branch road; and
displaying the second speed limit information when the calculated difference exceeds the predetermined level and when the vehicle does not enter the branch road.

* * * * *